United States Patent Office 3,843,347
Patented Oct. 22, 1974

3,843,347
MICROBIOCIDAL SULFOXONIUM HALIDE DIIODIDES
Robert J. Herschler and Merle E. Cisney, Camas, Wash., assignors to Crown Zellerbach Corporation, San Francisco, Calif.
No Drawing. Continuation of abandoned application Ser. No. 430,695, Feb. 5, 1965. This application Feb. 1, 1971, Ser. No. 111,734
Int. Cl. A01n 9/14
U.S. Cl. 71—67
4 Claims

ABSTRACT OF THE DISCLOSURE

A method of inhibiting the growth of certain living organisms with sulfonium and sulfoxonium halide diiodides by contacting the organism with the diiodide compound in an amount effective to inhibit the growth thereof in the presence of water. The organisms whose growth may be thus inhibited include green algae, plant mosaic viruses and papermill slime microorganisms.

CROSS-REFERENCE TO RELATED APPLICATIONS

This application is a continuation of Ser. No. 430,695, filed Feb. 5, 1965, now abandoned.

BACKGROUND OF THE INVENTION

This invention relates to new compositions of matter and their use as an iodine source, and particularly to sulfonium and sulfoxonium halide diiodides and their use as iodine sources.

It is known that iodine is an active and rapid non-selective biocide. Iodine in the free form is a highly reactive substance and combines with proteins partially by chemical reaction and partially by sorption. The iodine-protein combination is believed to be the main mechanism whereby it serves as a biocide. However, iodine as a tincture or solution in aqueous potassium iodide, is rapidly inactivated in the presence of organic matter such as serum, blood, urine, milk and so forth. While tincture of iodine continues to be used for skin sterilization, it is not very effective due to this rapid inactivation. The use of iodine for deep wounds is impossible because concentrations strong enough to overcome serum and blood contamination exert an adverse effect on the mechanisms invloved in wound healing. At present, the use of iodine as a biocide in biologically contaminated water, such as the water systems of paper mills, cooling water systems, swimming pools, etc. is impractical due to the rapid inactivation of the iodine because of its combination with or attachment to the substrates that may be present.

Iodoform (triiodomethane) has also enjoyed favor in the past as an anti-septic for wound treatment because of its low irritation threshold for tissue. However, the iodine released from iodoform rapidly disipates and iodoform dressings have to be changed frequently.

More recently iodine complexes with quaternary ammonium compounds have been suggested as biocides. These complexes are stated to be nonirritating to the skin and mucous membranes. Combinations of iodine and polyvinylpyrrolidone have also been recommended as biocides. Also, a number of iodine complexes have been marketed as germicides. While these materials all have commercial interest, they have several disadvantages in practice: they release only two-thirds of the theoretically available iodine; they are foamers; and the iodine that is released is released rapidly, and quickly dissipates.

SUMMARY OF THE INVENTION

It is an object of this invention, therefore, to provide a process for inhibiting the growth of certain living organisms employing iodine containing compounds which are capable of slowly releasing all theoretically available iodine over a long period of time, which are not foamers, and which are not rapidly inactivated by proteinaceous substances.

These and other objects are attained as described in the following disclosure.

It has been found that sulfonium and sulfoxonium halide diiodides release all of their theoretically available iodine at a slow rate over a long period of time in the presence of water. These compounds are, therefore, useful in any environment requiring the presence of iodine over long periods of time. They are useful as biocides for all types of microorganisms, including bacteria, viruses, fungi, yeasts, and algae. Herein, whenever we refer to "biocide" we intend to mean a material which acts against any or all of the aforementioned microorganisms.

DETAILED DESCRIPTION OF PREFERRED EMBODIMENTS

The sulfonium and sulfoxonium halide diiodides may be represented by the general formula

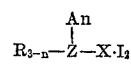

wherein R represents an alkyl group having from 1 to about 16 carbon atoms, A represents an aryl group selected from the group consisting of phenyl, hydroxyphenyl, hydroxymethylphenyl, and carboxymethoxyphenyl, X is a halide selected from the group consisting of chloride, bromide and iodide, $I_2$ is iodine, Z is selected from the group consisting of

and $n$ is an integer which, when Z is S is from 0 to 3, and when Z is

is 0. Thus the sulfonium halide diiodides have the general formula

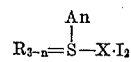

and the sulfoxonium halide diiodides have the general formula

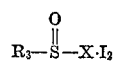

The alkyl and aryl groups may be substituted or unsubstituted, and where more than one alkyl or aryl group is present, they may be the same group or different groups. The mechanism of the reaction whereby iodine is released from sulfonium and sulfoxonium halide diiodides is believed to be as follows:

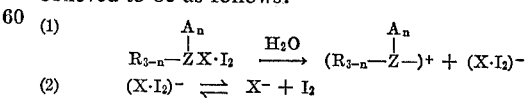

When the free iodine in the reaction system reaches about 2% to 3% by weight of the total iodine theoretically available, the release ceases and the reaction is at equilibrium. If iodine is removed from the system, as by sorption or reaction with a substrate, the reactions (1) and (2) proceed at a slow rate toward the formation of more iodine. The release of iodine continues until all the theoretically available iodine has been released.

Alkyl sulfonium halide diodides that have been found to be especially useful include the trimethyl sulfonium halide diiodides and the dodecyl dimethyl sulfonium halide diiodides. Aryl sulfonium halide diiodides that are especially useful include the hydroxyphenyl dimethyl sulfonium halide diiodides, the 4-hydroxy-2-methyl-phenyl dimethyl sulfonium halide diiodides. Other useful sulfonium halide diiodides will be described hereinafter.

The sulfonium halide diiodides may be prepared by reacting a sulfonium halide with the stoichiometric amount of iodine. The particular sulfonium halide chosen determines the character of the sulfonium halide diiodide complex. The following example illustrates the preparation of trimethyl sulfonium chloride diiodide:

EXAMPLE 1

Solid trimethyl sulfonium chloride was added to solid iodine in a mole to mole ratio; 18.19 grams of trimethyl sulfonium chloride was combined with 41.06 grams of iodine. The two dry compounds were admixed together at 23° C. with a thermometer in the reaction mass. There was no rise in temperature. Because of a slight endothermic reaction the complete solution of the two constituents was achieved by heating the mixture to approximately 40° C. under a hot water tap. A dark colored liquid was immediately formed and was identified as trimethyl sulfonium chloride diiodide. Cooling to room temperature caused this dark liquid to crystallize as dark metallic needles.

Other alkyl sulfonium halide diiodides may be prepared by the general method given above by merely substituting other alkyl sulfonium halide salts for the trimethyl sulfonium chloride employed in the above example. The preparation of aryl sulfonium halide diiodides is effected by the same general method by substituting an aryl sulfonium halide for the trimethyl sulfonium chloride in the example. Among the suitable aryl sulfonium halides are the hydroxyaryl sulfonium chlorides, prepared as disclosed in U.S. Pat. 3,133,971 to MacGregor, incorporated herein by reference. Substituted derivatives of aryl sulfonium halide diiodides may also be prepared as, for example, by reacting the sodium salt of a hydroxy phenyl sulfonium halide with any omega halo aliphatic acid. The following example illustrates the preparation of 4-carboxymethoxyphenyl dimethyl sulfonium chloride diiodide:

EXAMPLE 2

One equivalent weight of 4-hydroxyphenyl dimethyl sulfonium chloride was reacted in methanol with one equivalent weight of sodium hydroxide. One equivalent weight of 2-chloroacetic acid was added and the precipitated sodium chloride filtered off. Tests showed that phenoxy substitution was effected. The resultant white carboxymethoxyphenyl dimethyl sulfonium chloride, in warm methanol, was reacted with a molecular weight of iodine in methanol. A dark precipitate was formed, nearly black in color, with an acrid odor, which was identified as 4-carboxymethoxyphenyl dimethyl sulfonium chloride diiodide. This product was very insoluble in all common laboratory solvents tested.

Sulfoxonium halide diiodides that have been found to be especially useful include the trimethyl sulfoxonium halide diiodides and the dodecyl dimethyl sulfoxonium halide diiodides.

The sulfoxonium halide diiodide compounds are prepared by reacting a dialkyl sulfoxide with a suitable alkyl halide to obtain a trialkyl sulfoxonium halide, which is then reacted with iodine to form the sulfoxonium halide diiodide. The following example illustrates the preparation of dodecyl dimethyl sulfoxonium iodide diiodide:

EXAMPLE 3

One equivalent weight of dodecyl methyl sulfoxide in methanol was reacted with one equivalent weight of methyl iodide. The mixture was allowed to stand for one week and a crystalline product was collected which was identified as dodecyl dimethyl sulfoxonium iodide. One molecular weight of this product was blended with one molecular weight of iodine wet with methanol. A dark metallic product was obtained which was identified as dodecyl dimethyl sulfoxonium iodide diiodide.

The iodine release properties of the compounds of this invention are illustrated in the following example.

EXAMPLE 4

Trimethyl sulfonium iodide diiodide, dodecyl dimethyl sulfonium iodide diiodide, 4-hydroxyphenyl dimethyl sulfonium chlorie diiodide, 4-carboxymethoxyphenyl dimethyl sulfonium chloride diiodide, hexadecyl dimethyl sulfonium iodide diiodide and trimethyl sulfoxonium iodide diiodide were tested for iodine release rate in distilled water at 20° C. Accurately weighed samples of each of these materials were placed into 250 ml. Erlenmeyer flasks containing 100 ml. of distilled water plus starch solution as an indicator. A magnetic stirrer was used for agitation, as necessary. The percent by weight release of iodine based on iodine theoretically available for each compound was measured through continued removal of iodine by titration with sodium thiosulphate. By "theoretically available iodine" we mean only the complexed iodine of the diiodide compounds, and do not mean to include any ionic iodide that may be present as the halide located between the sulfur atom and the terminal complexed iodine. It was noted that the release rate for each compound is fairly constant, and drops sharply above 2 or 3% by weight of the theoretically available iodine unless the free iodine is removed, as by titration.

Experiments were conducted to determine the minimum amount of water necessary to obtain iodine release. It was found that the amount of water necessary to effect iodine release is more dependent upon the amount of diluent present than upon the amount of active material. The results in the following example are presented by way of illustration only, and are not to be construed as limiting the scope of the invention:

EXAMPLE 5

Two samples of trimethyl sulfonium chloride diiodide weighing 0.1 gm. each were placed into 20 ml. of 100% ethanol. Starch granules ranging in size from 1/32 inch to 1/16 inch in diameter were added. Distilled water was added until a change in color in the starch granule surface was noted, indicating iodine release. Tests were conducted at 26° C. It required an average of 4.4 ml. of water to cause iodine release. This is an average of 18.0% by volume of water, based on the the total solution volume.

While the amount of water necessary to effect iodine release depends upon the particular compound employed, those compounds having a slower iodine release rate than the trimethyl sulfonium chloride diiodide of the foregoing Example 5 will require relatively more water to effect release.

Paper mills use large quantities of water in stock preparation. Pulp slurries contain various bacteria, yeasts and fungi. These microorganisms find a favorable growth medium in pulp and accumulate in pulp stock systems and cause what is commonly referred to as a paper mill slime. Since a large portion of the water used in paper mills is re-used, slime is objectionable because it causes slime spots in the paper, and other difficulties. Tests were made to determine the utility of sulfonium diiodide compounds as slimicides. Examples 6 and 7 below set forth the results of these tests:

EXAMPLE 6

Trimethyl sulfonium iodide diiodide, dodecyl dimethyl sulfonium iodide diiodide and 4-hydroxyphenyl dimethyl sulfonium chloride diiodide employed as 20% by weight solutions in methanol, hereinafter referred to as compositions A, B and C, and Lugol's solution were compared for the control of paper mill slime organisms. The substrate was groundwood pulp at 0.3% consistency to samples of which were added compositions A, B and C, and Lugol's solution at concentrations of 100 p.p.m. potentially available iodine. 1 ml. samples of the substrate were taken periodically and placed upon agar plating medium of Sabouraud's dextrose agar. Counts were made on 24 hour plates incubated at 37° C. Results of these tests are shown in Table 1.

TABLE 1

| Slimicide | Microorganism count per ml at— | | | |
|---|---|---|---|---|
| | 0 hour | 1 hour | 2 hours | 24 hours |
| Composition A | >100,000 | 0 | 0 | 0 |
| Composition B | >100,000 | 0 | 0 | 0 |
| Composition C | >100,000 | 0 | 0 | 0 |
| Lugol's solution | >100,000 | >100,000 | >100,000 | >100,000 |

These results indicate that the iodine provided in Lugol's solution is rapidly sorbed by the wood fibres and inactivated, whereas compositions A, B and C continued to be effective slimicides after 24 hours.

EXAMPLE 7

Trimethyl sulfonium chloride diiodide was compared with various prior art slimicides for slimicidal properties. Trimethyl sulfonium chloride diiodide was employed as a 20% by weight solution in methanol. To this was added 0.25% by weight of Triton X–100, which is an alkyl aryl polyether alcohol, to assist in initial dispersion of the material in water. Table 2 as follows gives the percentage reduction of microbial numbers using various concentrations of slimicide. The tests were conducted on a pulp substrate system of 0.3% groundwood. The results are for a two hour reaction time. The concentrations of slimicide are given in parts per million (p.p.m.) of active material.

TABLE 2

Percent reduction of microbial numbers at various slimicide concentrations

| Slimicide | Slimicide concentration (p.p.m.) | | | | | |
|---|---|---|---|---|---|---|
| | 5 | 10 | 20 | 40 | 80 | 160 |
| (1) Product 589 (25% active) | 5 | 6 | 15 | 15 | 25 | 28 |
| (2) RX–15 (Betz) | 5 | 10 | 14 | 22 | 27 | 30 |
| (3) RX–17 (Betz) | 6 | 11 | 30 | 41 | 56 | 86 |
| (4) Busan 881 (Buckman) | 6 | 8 | 11 | 11 | 13 | 14 |
| (5) Trimethyl sulfonium chloride diiodide | 6 | 24 | 32 | 91 | 99 | 99 |

Product 589 is a formulated trichlorinated levulinic acid composition RX–15 and RX–17 are formulated chlorinated phenols; and Busan 881 contains, as active ingredients, disodium cyanodithiocarbonate (12.7%), ethylenediamine (4.8%) and potassium N-methylidithiocarbamate (17.5%).

As can be seen from an examination of the results reported in Table 2 above, trimethyl sulfonium chloride diiodide gave significantly better slime control than the other slimicides tested.

The following example illustrates the use of trimethyl sulfoxonium chloride diiodide as an algaecide:

EXAMPLE 8

A green algae (Chlorella) was propagated in a conventional inorganic nutrient medium under artificial light. A 50 p.p.m. treatment of trimethyl sulfoxonium chloride diiodide as a 10% by weight solution in methanol was administered to the algae culture. Within three days all the algae were destroyed due to the treatment.

The sulfonium halide diiodides have also proved useful as a virucide. Examples 9 and 10 following illustrate the use of trimethyl sulfonium chloride diiodide as an in vitro and in vivo control agent for the plant virus alfalfa mosaic virus (AMV). Example 11 illustrates the effectiveness of 4-carboxymethoxyphenyl dimethyl sulfonium chloride diiodide against tobacco mosaic virus (TMV).

EXAMPLE 9

A 20% by weight solution of trimethyl sulfonium chloride diiodide (TMSClI$_2$) in methanol was diluted to concentrations of 1:10, 1:100 and 1:1000 by volume TMSClI$_2$ in water. These were added to a tissue mull of Black Cowpea having a high AMV titer. After 30 minutes contact, standard leaf inoculations to cowpea were made using fine Carborundum powder in the tissue mull to break the cell wall of the cowpea leaves. The result after 7 day is shown in Table 3 as follows:

TABLE 3

Antiviral Test of TMSClI$_2$—Added to Tissue Mull

| TMSClI$_2$ concentration in water: | Average lesions per leaf |
|---|---|
| 1:10 | 0.0 |
| 1:100 | 3.2 |
| 1:1000 | 20.7 |
| Control (no TMSClI$_2$) | 44.3 |

EXAMPLE 10

In vivo testing of trimethyl sulfonium chloride diiodide as a virus control agent comprised spraying the same concentrations of TMSClI$_2$ in water prepared as in Example 9 upon the leaves of cowpea. Five days after treatment the leaves were inoculated with AMV by employing a tissue mull having a high AMV titer and containing Corborundum powder. Table 4 below reports the results after one week:

TABLE 4

Antiviral Test of TMSCl$_2$—Sprayed on Leaves Before Inoculation

| TMSClI$_2$ concentration in water: | Average lesions per leaf |
|---|---|
| 1:10 | 2.5 |
| 1:100 | 3.8 |
| 1:1000 | 3.8 |
| Control (no TMSClI$_2$) | 47.3 |

The results of the tests in Examples 9 and 10 show outstanding control of AMV by employing a sulfonium halide diiodide compound as the antiviral agent. It is particularly interesting that high antiviral activity could be measured 5 days after the sulfonium halide diiodide was applied. Commercial virucides presently available do not provide such long term protection.

EXAMPLE 11

Connecticut tobacco plants infected with a well developed pattern of tobacco mosaic virus (TMV) from a crystalline source were sprayed with 0.1% by weight solution of 4-carboxymethoxyphenyl dimethyl sulfonium chloride diiodide in 40/60 by volume ethanol/water. Spraying was repeated two more times at 7 days intervals. New growth observed 4 weeks after the last diiodide treatment was free of virus symptoms. A transmission attempt by the tissue mull Carborundum technique gave negative results. Only slight phytotoxicity was observed with slight marginal leaf necrosis.

From the foregoing it is seen that the diiodide compositions of this invention are effective biocides for all types of microorganisms. It should be pointed out that the biocidal effect appears to be due to more than just the release of iodine alone, although this latter is important. The same biocidal effects are not obtained by iodine alone. It appears, therefore, that more than just the release of iodine is involved in the biocidal properties of the compositions of the invention. While the reasons for this are not entirely understood, it is hypathesized that the compounds of this invention, being complexes, have a charge opposite that of microorganisms which are negatively charged, and are attracted thereto, bringing the compound into close proximity to the microorganisms to be killed before iodine is released. Thus, the iodine released is more effective since it is more likely to be taken up by the microorganism and less likely to be tied up by other substrates. Also, the organic "carrier" with which the iodine is complexed, i.e., the sulfonium or sulfoxonium halide, exhibits some biocidal properties itself, the degree depending upon the carrier. As to the degree of toxicity of the "carrier," it has been observed that the 12 carbon atom group, as in the dodecyl dimethyl sulfonium halides, appears to effect optimum toxicity. The 10 carbon atom decyl group and the 14 carbon atom tetradecyl group exhibit less biocidal properties than the dodecyl group when present in a sulfonium halide. It is to be emphasized however, that the diiodide complexes made from these "carriers" are much more potent biocides than the carriers themselves.

In shipping and storing the diiodide compounds disclosed herein, it is important to place them into a diluent which permits ease of application to the environment desired, is economical, and one which prevents premature iodine release. It has been found that the ideal diluent is methanol. It permits solution of up to 20% by weight of most diiodide compounds and the methanol solution may be added to water in the required proportion to activate iodine release. Ethanol, while useful as a diluent generally was found to be less suitable for shipping and storing the trimethyl halide diiodide compositions due to the fact that only low percentages of the diiodide compound could be added before precipitation occurred. Of course, where it is not desired to store the compounds for any length of time, aqueous or other disperions or solutions may be made directly. It has been found that aqueous dispersions are obtained where the diiodide is present in quantities above about 0.4% by weight. Below about 0.4% by weight, solutions are obtained. Other diluents that may be used include glycerin, which is highly soluble in water, and mixtures of glycerin with other diluents.

Since the compounds of this invention must be used in aqueous systems, it has been found that in order to obtain good dispersion of the compounds in such systems it is essential to add a nonionic surfactant-dispersant. Satisfactory surfactant-dispersants for non-animal use are alkylaryl polyether alcohols; for example, Triton X-100, the Igepols and the Emulphors. For animal applications, sugar esters such as sucrose monooleate are satisfactory. Other nonionic surfactant-dispersants that may be used include polyethylene oxy esters, glycerol monstearate, and the series of Spans which are fatty esters of sugar alcohols such as mannitol. No more than about 1% by weight of the active ingredient of the surfactant-dispersant should be used for topical applications, such as for plants, since amounts in excess of this would cause the diiodide compound to be washed off too easily. We prefer to use about 0.2% by weight active ingredient, which is just about the minimum amount that is effective.

What is claimed is:

1. A method of inhibiting the growth of green algae comprising contacting the green algae with a growth inhibiting amount of a trimethyl sulfoxonium halide diiodide, wherein said halide is selected from the group consisting of chloride and iodide.

2. A method of inhibiting the growth of plant mosaic viruses comprising contacting said plant mosaic viruses with a growth inhibiting amount of a trimethyl sulfonium halide diiodide, wherein said halide is selected from the group consisting of chloride and iodide.

3. The method of claim 2 wherein the diiodide is trimethyl sulfonium chloride diiodide.

4. A method for inhibiting the growth of microorganisms causing papermill slime comprising contacting said microorganisms with a growth inhibiting amount of a trimethyl sulfonium halide diiodide, wherein the halide is selected from the group consisting of chloride and iodide.

References Cited
UNITED STATES PATENTS 2,836,625   5/1958   Weesner _____ 260—607

VINCENT D. TURNER, Primary Examiner

U.S. Cl. X.R.

162—161; 424—337